UNITED STATES PATENT OFFICE.

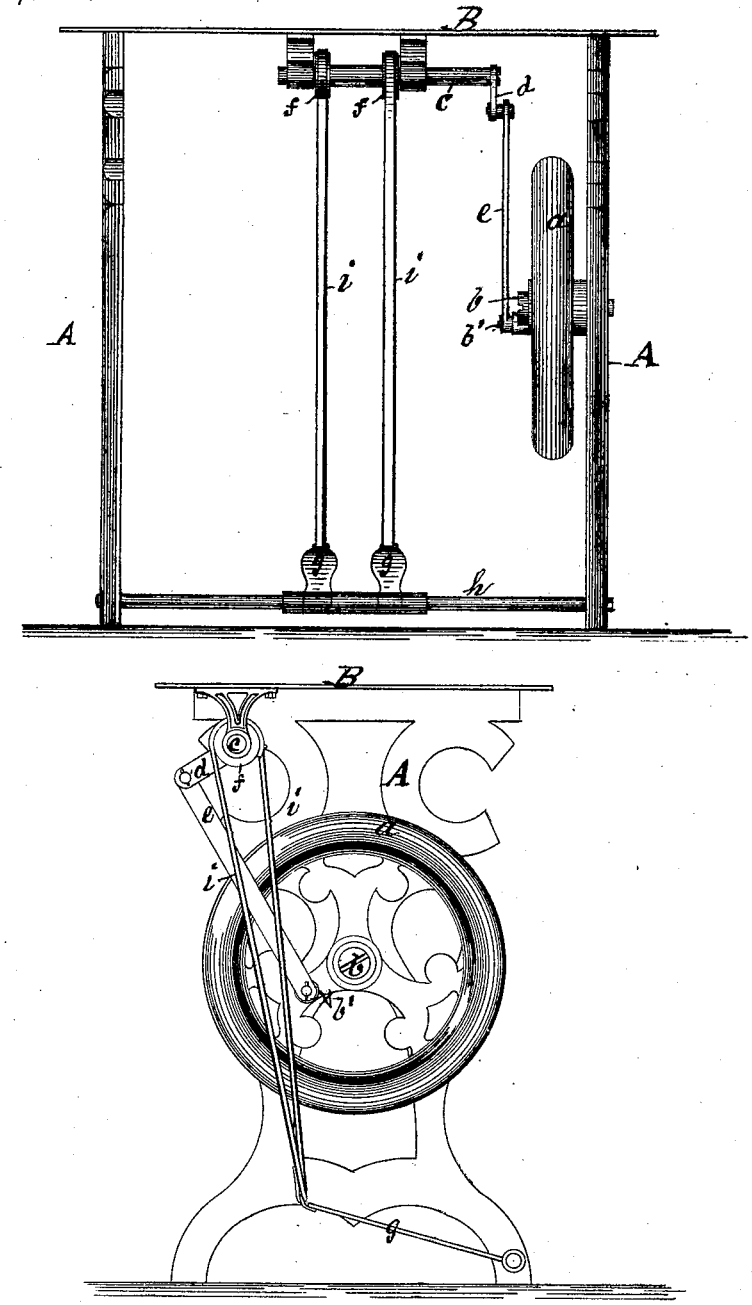

JOHN R. HENSHAW, OF MIDDLETOWN, CONNECTICUT.

IMPROVEMENT IN TREADLES FOR SEWING-MACHINES.

Specification forming part of Letters Patent No. 130,128, dated August 6, 1872.

*To all whom it may concern:*

Be it known that I, JOHN R. HENSHAW, of Middletown, county of Middlesex and State of Connecticut, have invented a new and useful Improvement in Device for Operating a Machine by Foot; and to enable others skilled in the art to make and use said invention, I will proceed to describe, referring to the drawing, in which the same letters indicate like parts in each of the figures.

The nature of this invention consists in combining a reciprocating device (operated by the alternate action of the feet upon foot-pads) with a rotary or revolving wheel, from which the motion is transmitted to the machine or mechanism. The object of this machine or device is to impart motion from the driving-wheel to a machine by the alternate action of the feet, without producing tiresomeness of the feet and body that is usually produced by foot-machines.

In the accompanying drawing are shown a side and end view of a frame and bed upon which the machine is arranged and secured that is designed to be operated by this device.

A A is the frame-work. B is a bed-plate, secured to the upper end of the frame. $a$ is a driving-wheel, which is secured and revolves upon a stud-pin, $b$, inside of the frame, and is provided with a crank-pin, $b'$. $c$ is a vibrating shaft having its bearing in boxes secured to the under side of the bed-plate. Upon one end of this shaft $c$ is secured a crank, $d$. The motion is transmitted from the vibrating shaft $c$ to the revolving driving-wheel $a$ by means of an arm, $e$. $ff$ are wheels, firmly secured on the vibrating shaft. $gg$ are foot-treadles, secured on the shaft or girt $h$. One end of the straps $ii$ are secured to the outer end of the treadles, while the other ends of said straps are passed around the circumference of and are secured to the wheels $ff$, one passing over and secured to one wheel from one direction, and the other from the opposite direction.

Thus it will be seen that when the pressure of the feet is applied alternately to the treadles a vibratory motion is produced to the shaft $c$ and its crank $d$, and through the connecting-arm $e$ a revolving motion is produced to the driving-wheel $a$.

Thus I am enabled to produce an easy motion, and much less irksome to the operator than the devices heretofore in use.

What I claim, and desire to secure by Letters Patent, is—

The shaft $c$ having pulleys or wheels $f$, operating in combination with crank $d$ and arm $e$, and with straps $i$ and treadles $g$, substantially as and for the purpose specified.

JOHN R. HENSHAW. [L. S.]

Witnesses:
GEO. A. McLAUGHLIN,
ROBERT G. PIKE.